United States Patent [19]

Hill et al.

[11] Patent Number: 5,047,977

[45] Date of Patent: Sep. 10, 1991

[54] METHODS OF GENERATING AND RETRIEVING ERROR AND TASK MESSAGE RECORDS WITHIN A MULTITASKING COMPUTER SYSTEM

[75] Inventors: Reginal R. Hill, Pflugerville; Richard J. Hrabik, Leander, both of Tex.

[73] Assignee: International Business Machines Corporation, Armonk, N.Y.

[21] Appl. No.: 529,672

[22] Filed: May 29, 1990

Related U.S. Application Data

[63] Continuation of Ser. No. 179,178, Apr. 8, 1988, abandoned.

[51] Int. Cl.[5] ........................ G06F 11/34; G06F 15/40

[52] U.S. Cl. ........................ 364/900; 364/963; 364/948.11; 364/943.9; 371/16.5; 371/29.1

[58] Field of Search ........................ 371/29.1, 16.5, 48; 364/200, 900

[56] References Cited

U.S. PATENT DOCUMENTS

| | | | |
|---|---|---|---|
| 3,704,363 | 11/1972 | Salmassy et al. | 364/200 |
| 4,318,184 | 3/1982 | Millet et al. | 364/900 |
| 4,433,392 | 2/1984 | Beaven | 364/900 |
| 4,649,513 | 3/1987 | Martin et al. | 364/900 |
| 4,674,065 | 6/1987 | Lange et al. | 364/900 |
| 4,750,151 | 6/1988 | Baus | 364/900 |
| 4,754,326 | 6/1988 | Kram et al. | 364/900 |
| 4,814,592 | 3/1989 | Bradt et al. | 235/381 |
| 4,914,583 | 4/1990 | Weisshaar et al. | 364/200 |
| 4,922,491 | 5/1990 | Coale | 371/16.1 |

OTHER PUBLICATIONS

An Introduction to Database Systems, vol. 11, C. J. Date, IBM Corporation, Jul. 1984, pp. 11-16.

*Primary Examiner*—Michael R. Fleming
*Assistant Examiner*—Gopal C. Ray
*Attorney, Agent, or Firm*—Casimer K. Salys; H. St. Julian

[57] ABSTRACT

The invention relates to the retrieval of data records from a computer system. A user may retrieve selected error data records by specifying criteria and activating an error services utility. Only the error record data which satisfies the specified criteria will be printed or displayed. The user may also retrieve selected message data records by specifying criteria and activating an message services utility. The user may specify the display of selected messages which were generated by a specified component within the computer system. Moreover, after displaying a selected message, the user may request the system to display more detailed information regarding the displayed message.

5 Claims, 7 Drawing Sheets

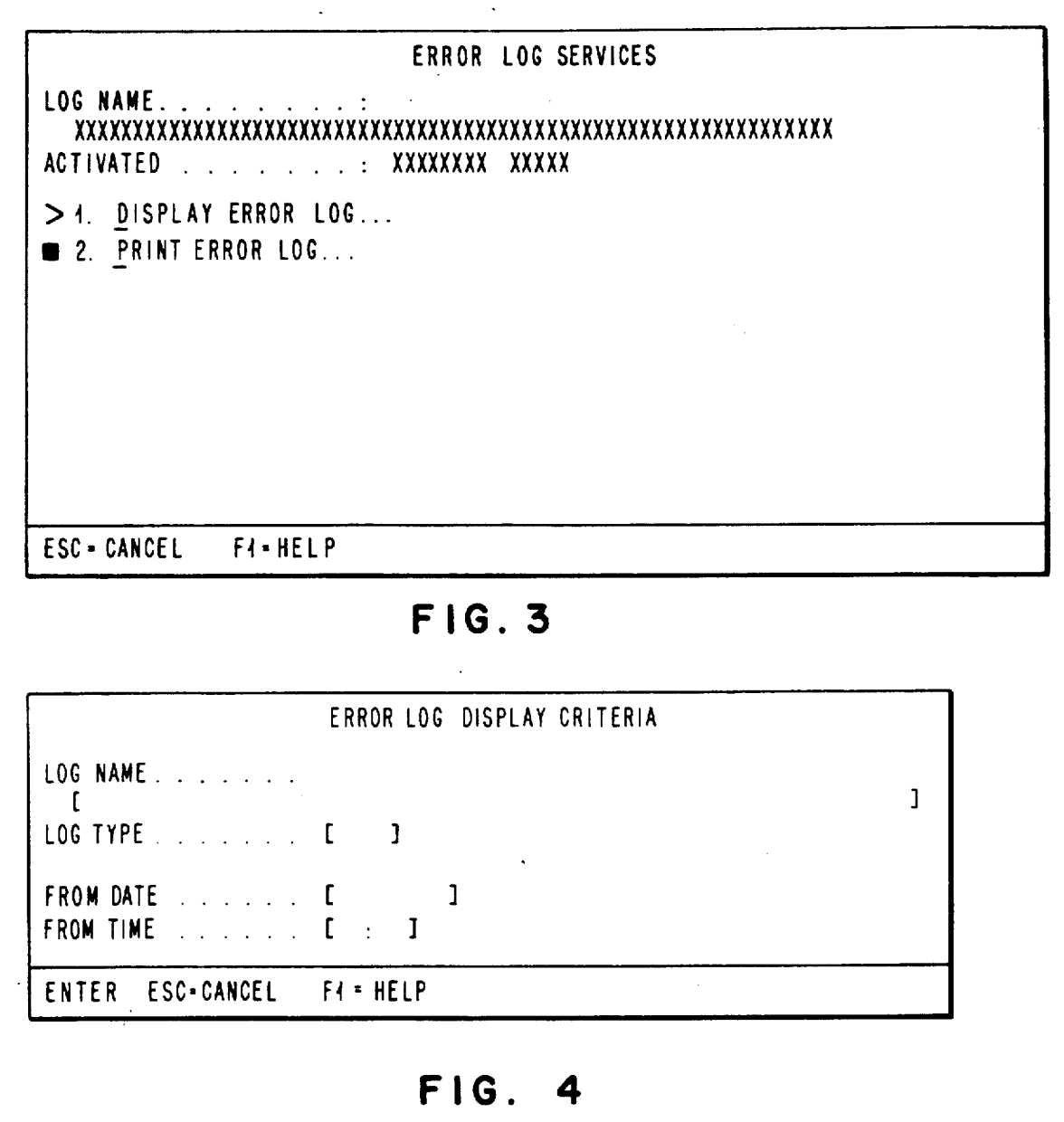

```
                    ERROR LOG SERVICES
LOG NAME. . . . . . . . . :
  XXXXXXXXXXXXXXXXXXXXXXXXXXXXXXXXXXXXXXXXXXXXXXXXXXXXXXXXXXXXXXXXXXXXXXX
ACTIVATED . . . . . . . . : XXXXXXXX  XXXXX

> 1. DISPLAY ERROR LOG...
■ 2. PRINT ERROR LOG...

ESC=CANCEL    F1=HELP
```

FIG. 3

```
               ERROR LOG DISPLAY CRITERIA

LOG NAME. . . . . . .
  [                                                      ]
LOG TYPE . . . . . . . [    ]

FROM DATE . . . . . .  [        ]
FROM TIME . . . . . .  [  :  ]

ENTER  ESC=CANCEL   F1 = HELP
```

FIG. 4

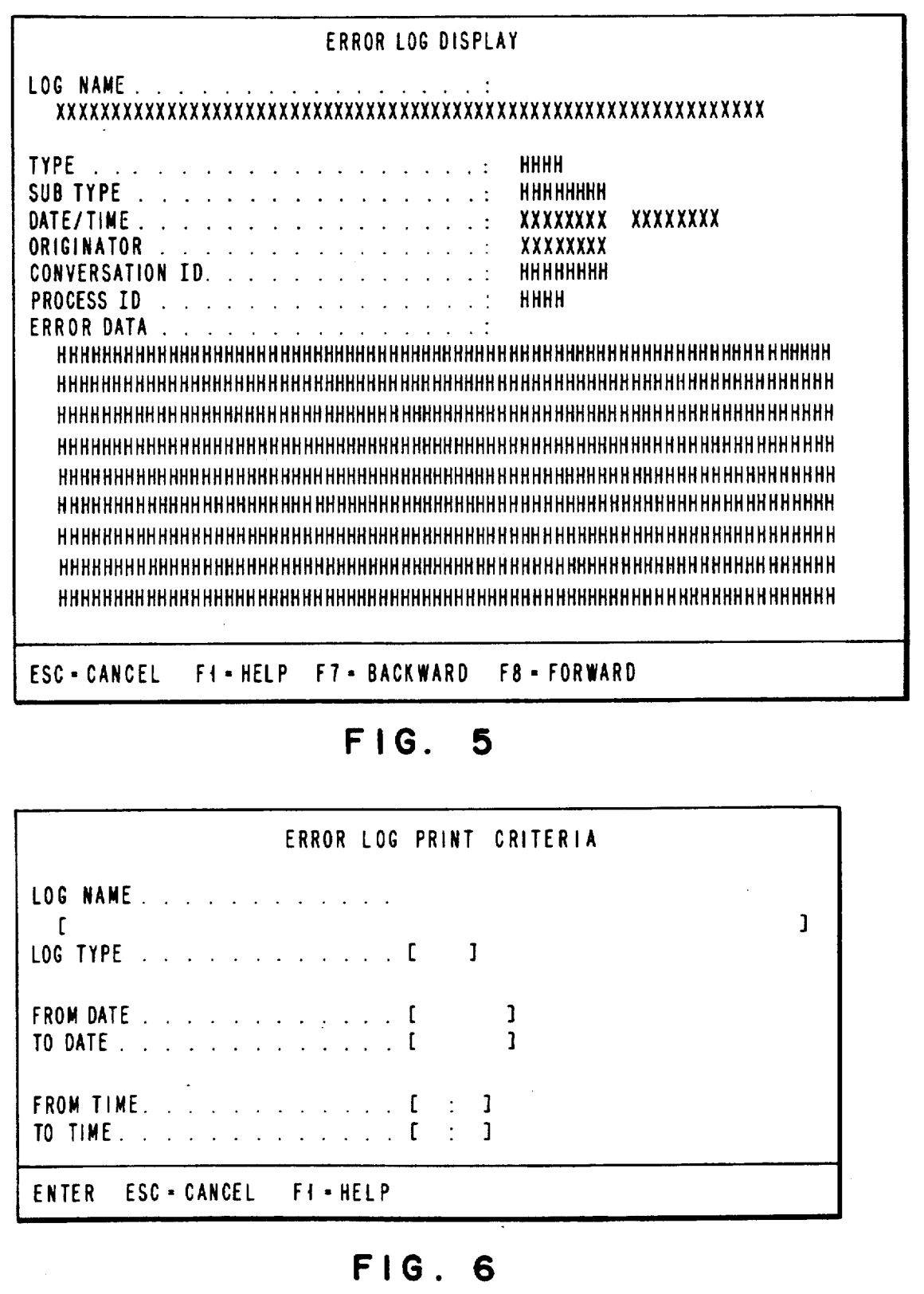

```
                      ERROR LOG DISPLAY
LOG NAME . . . . . . . . . . . . . . . . . . :
  XXXXXXXXXXXXXXXXXXXXXXXXXXXXXXXXXXXXXXXXXXXXXXXXXXXXXXXXXXXXXXXX

TYPE . . . . . . . . . . . . . . . . . . . . :  HHHH
SUB TYPE . . . . . . . . . . . . . . . . . . :  HHHHHHHH
DATE/TIME. . . . . . . . . . . . . . . . . . :  XXXXXXXX  XXXXXXXX
ORIGINATOR . . . . . . . . . . . . . . . . . :  XXXXXXXX
CONVERSATION ID. . . . . . . . . . . . . . . :  HHHHHHHH
PROCESS ID . . . . . . . . . . . . . . . . . :  HHHH
ERROR DATA . . . . . . . . . . . . . . . . . :
  HHHHHHHHHHHHHHHHHHHHHHHHHHHHHHHHHHHHHHHHHHHHHHHHHHHHHHHHHHHHHHHH
  HHHHHHHHHHHHHHHHHHHHHHHHHHHHHHHHHHHHHHHHHHHHHHHHHHHHHHHHHHHHHHHH
  HHHHHHHHHHHHHHHHHHHHHHHHHHHHHHHHHHHHHHHHHHHHHHHHHHHHHHHHHHHHHHHH
  HHHHHHHHHHHHHHHHHHHHHHHHHHHHHHHHHHHHHHHHHHHHHHHHHHHHHHHHHHHHHHHH
  HHHHHHHHHHHHHHHHHHHHHHHHHHHHHHHHHHHHHHHHHHHHHHHHHHHHHHHHHHHHHHHH
  HHHHHHHHHHHHHHHHHHHHHHHHHHHHHHHHHHHHHHHHHHHHHHHHHHHHHHHHHHHHHHHH
  HHHHHHHHHHHHHHHHHHHHHHHHHHHHHHHHHHHHHHHHHHHHHHHHHHHHHHHHHHHHHHHH
  HHHHHHHHHHHHHHHHHHHHHHHHHHHHHHHHHHHHHHHHHHHHHHHHHHHHHHHHHHHHHHHH
  HHHHHHHHHHHHHHHHHHHHHHHHHHHHHHHHHHHHHHHHHHHHHHHHHHHHHHHHHHHHHHHH
-----------------------------------------------------------------
ESC = CANCEL   F1 = HELP   F7 = BACKWARD   F8 = FORWARD
```

FIG. 5

```
                 ERROR LOG PRINT CRITERIA

LOG NAME . . . . . . . . . . . . .
  [                                                    ]
LOG TYPE . . . . . . . . . . . . . [    ]

FROM DATE . . . . . . . . . . . .  [        ]
TO DATE . . . . . . . . . . . . .  [        ]

FROM TIME. . . . . . . . . . . . . [  :  ]
TO TIME. . . . . . . . . . . . . . [  :  ]
-----------------------------------------------------------
ENTER   ESC = CANCEL   F1 = HELP
```

FIG. 6

```
LOG NAME . . . . :  .
  XXXXXXXXXXXXXXXXXXXXXXXXXXXXXXXXXXXXXXXXXXXXXXXXXXXXXXXXXXXXXXXX
ACTIVATED . . . . :  XXXXXXXX  XXXXX

TYPE . . . . . . :  HHHH
SUB TYPE . . . . :  HHHHHHHH
DATE/TIME . . . :  XXXXXXXX  XXXXXXXX
ORIGINATOR . . . :  XXXXXXXX
CONVERSATION ID. :  HHHHHHHH
PROCESS ID . . . :  HHHH
ERROR DATA . . . . :
  HHHHHHHHHHHHHHHHHHHHHHHHHHHHHHHHHHHHHHHHHHHHHHHHHHHHHHHHHHHHHHHHHHHHHH
  HHHHHHHHHHHHHHHHHHHHHHHHHHHHHHHHHHHHHHHHHHHHHHHHHHHHHHHHHHHHHHHHHHHHHH
  HHHHHHHHHHHHHHHHHHHHHHHHHHHHHHHHHHHHHHHHHHHHHHHHHHHHHHHHHHHHHHHHHHHHHH
  HHHHHHHHHHHHHHHHHHHHHHHHHHHHHHHHHHHHHHHHHHHHHHHHHHHHHHHHHHHHHHHHHHHHHH
  HHHHHHHHHHHHHHHHHHHHHHHHHHHHHHHHHHHHHHHHHHHHHHHHHHHHHHHHHHHHHHHHHHHHHH
  HHHHHHHHHHHHHHHHHHHHHHHHHHHHHHHHHHHHHHHHHHHHHHHHHHHHHHHHHHHHHHHHHHHHHH
  HHHHHHHHHHHHHHHHHHHHHHHHHHHHHHHHHHHHHHHHHHHHHHHHHHHHHHHHHHHHHHHHHHHHHH
  HHHHHHHHHHHHHHHHHHHHHHHHHHHHHHHHHHHHHHHHHHHHHHHHHHHHHHHHHHHHHHHHHHHHHH
  HHHHHHHHHHHHHHHHHHHHHHHHHHHHHHHHHHHHHHHHHHHHHHHHHHHHHHHHHHHHHHHHHHHHHH

TYPE . . . . . . :  HHHH
SUB TYPE. . . . . :  HHHHHHHH
DATE/TIME . . . . :  XXXXXXXX  XXXXXXXX
ORIGINATOR. . . . :  XXXXXXXX
CONVERSATION ID . :  HHHHHHHH
PROCESS ID. . . . :  HHHH
ERROR DATA . . . :
  HHHHHHHHHHHHHHHHHHHHHHHHHHHHHHHHHHHHHHHHHHHHHHHHHHHHHHHHHHHHHHHHHHHHHH
  HHHHHHHHHHHHHHHHHHHHHHHHHHHHHHHHHHHHHHHHHHHHHHHHHHHHHHHHHHHHHHHHHHHHHH
  HHHHHHHHHHHHHHHHHHHHHHHHHHHHHHHHHHHHHHHHHHHHHHHHHHHHHHHHHHHHHHHHHHHHHH
  HHHHHHHHHHHHHHHHHHHHHHHHHHHHHHHHHHHHHHHHHHHHHHHHHHHHHHHHHHHHHHHHHHHHHH
  HHHHHHHHHHHHHHHHHHHHHHHHHHHHHHHHHHHHHHHHHHHHHHHHHHHHHHHHHHHHHHHHHHHHHH
  HHHHHHHHHHHHHHHHHHHHHHHHHHHHHHHHHHHHHHHHHHHHHHHHHHHHHHHHHHHHHHHHHHHHHH
  HHHHHHHHHHHHHHHHHHHHHHHHHHHHHHHHHHHHHHHHHHHHHHHHHHHHHHHHHHHHHHHHHHHHHH
  HHHHHHHHHHHHHHHHHHHHHHHHHHHHHHHHHHHHHHHHHHHHHHHHHHHHHHHHHHHHHHHHHHHHHH
  HHHHHHHHHHHHHHHHHHHHHHHHHHHHHHHHHHHHHHHHHHHHHHHHHHHHHHHHHHHHHHHHHHHHHH
```

FIG. 7

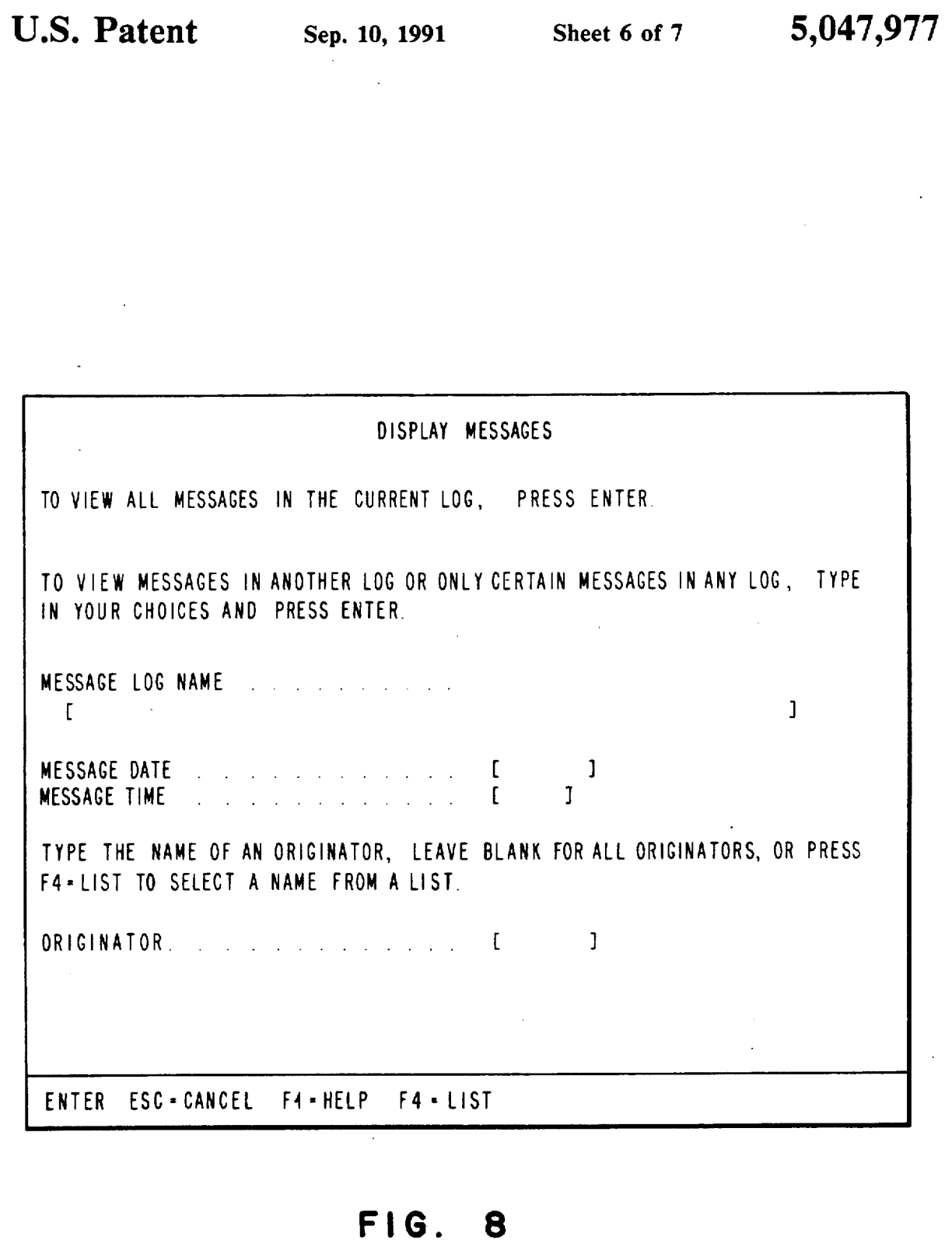

DISPLAY MESSAGES

TO VIEW ALL MESSAGES IN THE CURRENT LOG, PRESS ENTER.

TO VIEW MESSAGES IN ANOTHER LOG OR ONLY CERTAIN MESSAGES IN ANY LOG, TYPE IN YOUR CHOICES AND PRESS ENTER.

MESSAGE LOG NAME . . . . . . . . . .
[ ]

MESSAGE DATE . . . . . . . . . . . . . . [ ]
MESSAGE TIME . . . . . . . . . . . . . . [ ]

TYPE THE NAME OF AN ORIGINATOR, LEAVE BLANK FOR ALL ORIGINATORS, OR PRESS F4=LIST TO SELECT A NAME FROM A LIST.

ORIGINATOR. . . . . . . . . . . . . . [ ]

ENTER ESC=CANCEL F1=HELP F4=LIST

FIG. 8

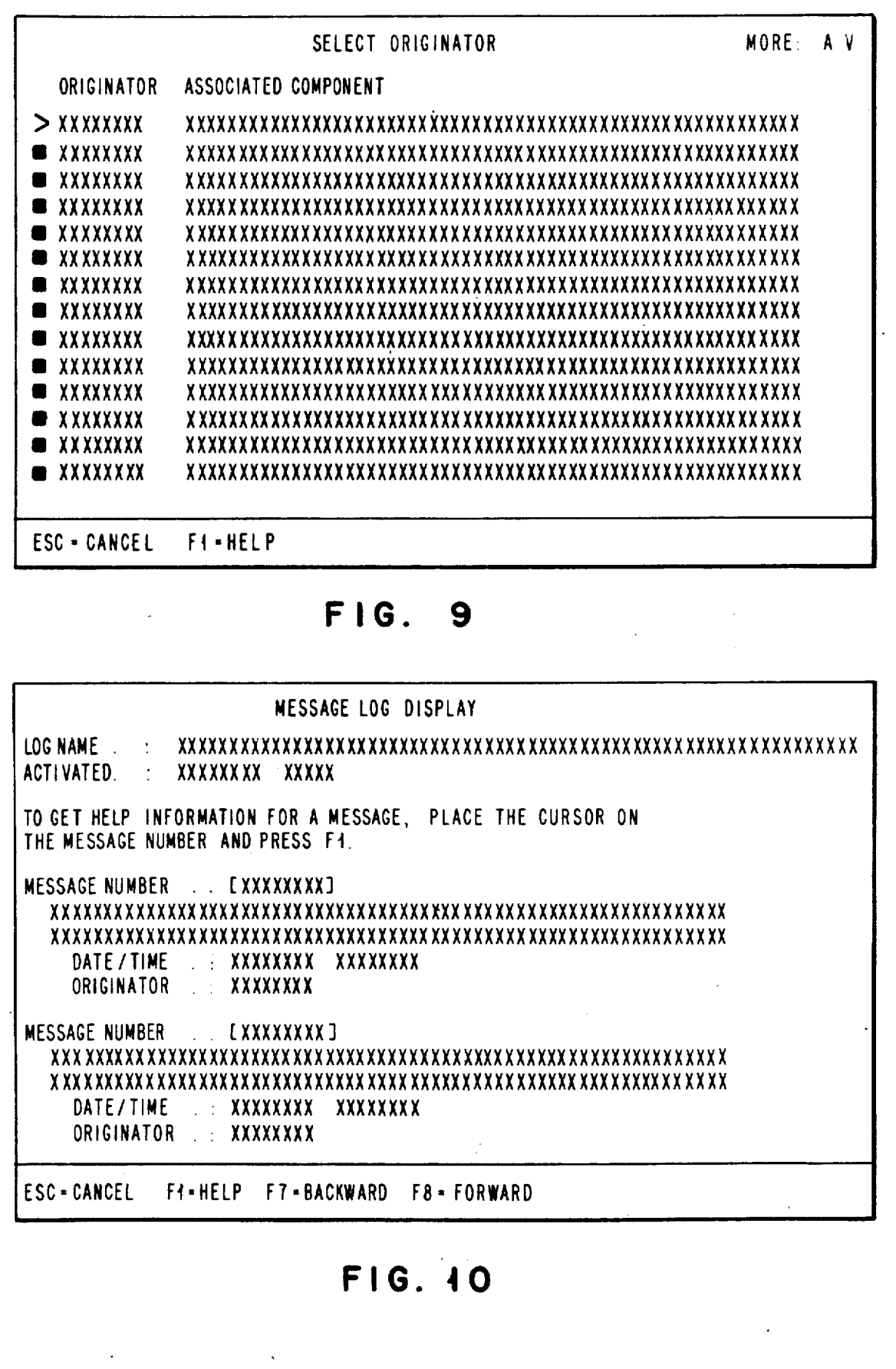

```
                         SELECT ORIGINATOR                      MORE:  A V

  ORIGINATOR  ASSOCIATED COMPONENT
> XXXXXXXX    XXXXXXXXXXXXXXXXXXXXXXXXXXXXXXXXXXXXXXXXXXXXXXXXXXXXXXXXXX
■ XXXXXXXX    XXXXXXXXXXXXXXXXXXXXXXXXXXXXXXXXXXXXXXXXXXXXXXXXXXXXXXXXXX
■ XXXXXXXX    XXXXXXXXXXXXXXXXXXXXXXXXXXXXXXXXXXXXXXXXXXXXXXXXXXXXXXXXXX
■ XXXXXXXX    XXXXXXXXXXXXXXXXXXXXXXXXXXXXXXXXXXXXXXXXXXXXXXXXXXXXXXXXXX
■ XXXXXXXX    XXXXXXXXXXXXXXXXXXXXXXXXXXXXXXXXXXXXXXXXXXXXXXXXXXXXXXXXXX
■ XXXXXXXX    XXXXXXXXXXXXXXXXXXXXXXXXXXXXXXXXXXXXXXXXXXXXXXXXXXXXXXXXXX
■ XXXXXXXX    XXXXXXXXXXXXXXXXXXXXXXXXXXXXXXXXXXXXXXXXXXXXXXXXXXXXXXXXXX
■ XXXXXXXX    XXXXXXXXXXXXXXXXXXXXXXXXXXXXXXXXXXXXXXXXXXXXXXXXXXXXXXXXXX
■ XXXXXXXX    XXXXXXXXXXXXXXXXXXXXXXXXXXXXXXXXXXXXXXXXXXXXXXXXXXXXXXXXXX
■ XXXXXXXX    XXXXXXXXXXXXXXXXXXXXXXXXXXXXXXXXXXXXXXXXXXXXXXXXXXXXXXXXXX
■ XXXXXXXX    XXXXXXXXXXXXXXXXXXXXXXXXXXXXXXXXXXXXXXXXXXXXXXXXXXXXXXXXXX
■ XXXXXXXX    XXXXXXXXXXXXXXXXXXXXXXXXXXXXXXXXXXXXXXXXXXXXXXXXXXXXXXXXXX
■ XXXXXXXX    XXXXXXXXXXXXXXXXXXXXXXXXXXXXXXXXXXXXXXXXXXXXXXXXXXXXXXXXXX
■ XXXXXXXX    XXXXXXXXXXXXXXXXXXXXXXXXXXXXXXXXXXXXXXXXXXXXXXXXXXXXXXXXXX

ESC = CANCEL   F1 = HELP
```

FIG. 9

```
                      MESSAGE LOG DISPLAY
LOG NAME  .  :  XXXXXXXXXXXXXXXXXXXXXXXXXXXXXXXXXXXXXXXXXXXXXXXXXXXXXXXXXXXXXXXXX
ACTIVATED .  :  XXXXXXXX  XXXXX

TO GET HELP INFORMATION FOR A MESSAGE, PLACE THE CURSOR ON
THE MESSAGE NUMBER AND PRESS F1.

MESSAGE NUMBER  . .  [XXXXXXXX]
   XXXXXXXXXXXXXXXXXXXXXXXXXXXXXXXXXXXXXXXXXXXXXXXXXXXXXXXXXXXXXXXX
   XXXXXXXXXXXXXXXXXXXXXXXXXXXXXXXXXXXXXXXXXXXXXXXXXXXXXXXXXXXXXXXX
     DATE/TIME  . :  XXXXXXXX  XXXXXXXX
     ORIGINATOR . :  XXXXXXXX

MESSAGE NUMBER  . .  [XXXXXXXX]
   XXXXXXXXXXXXXXXXXXXXXXXXXXXXXXXXXXXXXXXXXXXXXXXXXXXXXXXXXXXXXXXX
   XXXXXXXXXXXXXXXXXXXXXXXXXXXXXXXXXXXXXXXXXXXXXXXXXXXXXXXXXXXXXXXX
     DATE/TIME  . :  XXXXXXXX  XXXXXXXX
     ORIGINATOR . :  XXXXXXXX

ESC = CANCEL   F1 = HELP   F7 = BACKWARD   F8 = FORWARD
```

FIG. 10

METHODS OF GENERATING AND RETRIEVING ERROR AND TASK MESSAGE RECORDS WITHIN A MULTITASKING COMPUTER SYSTEM

This is a continuation of application Ser. No. 07/179,178 filed Apr. 8, 1988, now abandoned.

DESCRIPTION

1. Technical Field

This invention relates generally to problem determination, and more particularly to methods of retrieving data records to assist in determining problems in a computer system in an accurate and user friendly manner.

2. Background Information

Communication software program executing on a computer system may log error data or messages which occurred as a result of some software component failure or the unavailability of some function. Error data or messages in such a communication system typically is generated by a plurality of components within the system. If an error or message occurred, and the user wanted to display the contents thereof, the user may have to decipher large amounts of error data.

Consequently, there is a need for a method which enables the average user to retrieve specific errors and or messages from a communication software system in a user friendly manner.

DISCLOSURE OF THE INVENTION

This invention relates to methods of retrieving data from a communication software system operating on a computer system. One of a plurality of problem determination functions is selected. Parameters are entered for the selected one of the plurality of functions. An error record or message is then retrieved from the selected problem determination function in the communication software system which matches the specified parameters.

BRIEF DESCRIPTION OF THE DRAWING

FIGS. 3 through 10 are display screen which are employed by user of the computer system in retrieving records from a communication software system.

BEST MODE FOR CARRYING OUT THE INVENTION

Figure 1:
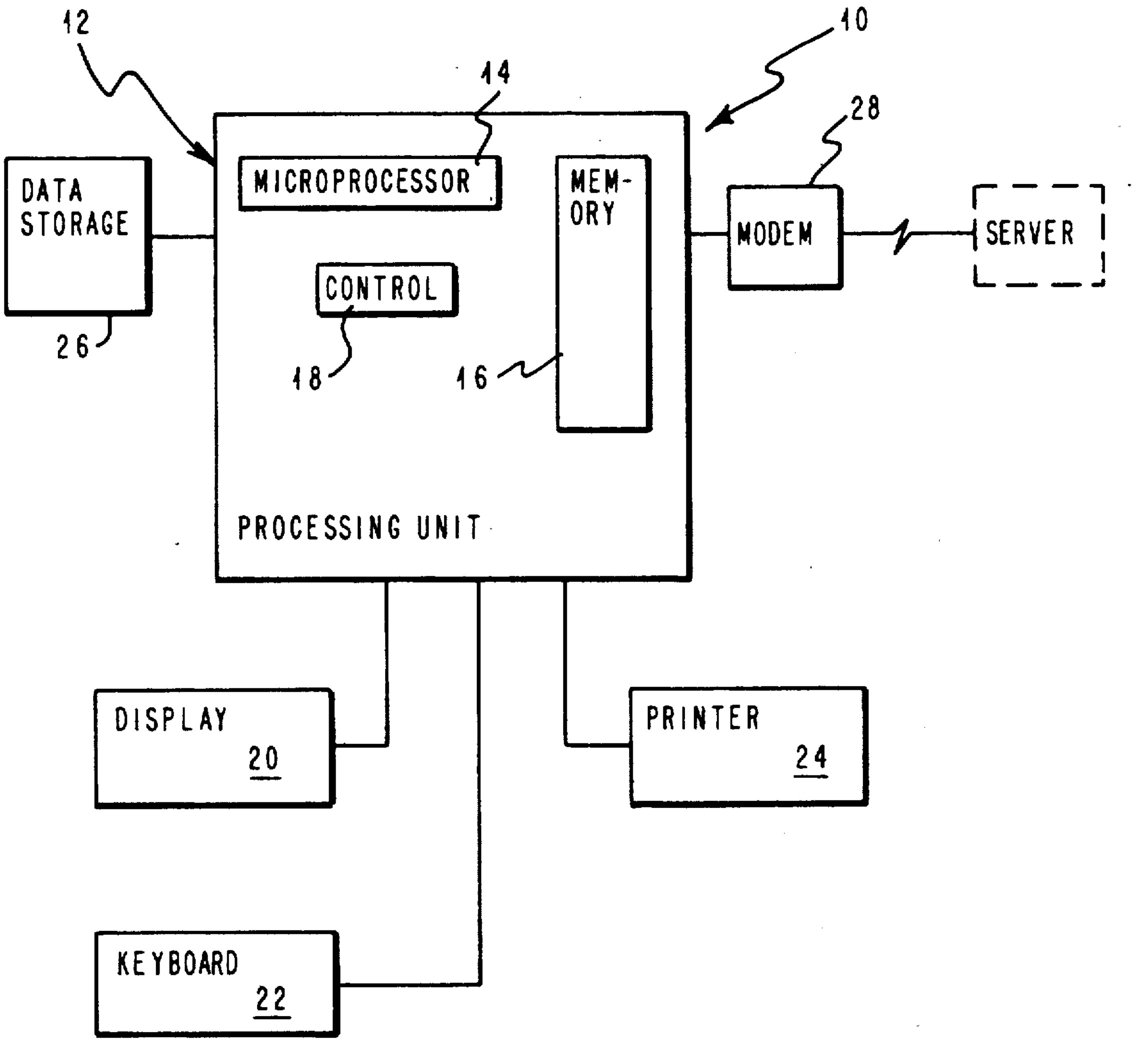
FIG. 1 is a block diagram of a computer system on which the method of the present invention may be employed.

Referring to FIG. 1, there is shown a computer system 10 on which the present invention may be employed. System 10 includes a central processing unit 12 having a microprocessor 14, a memory system 16 and a control system 18 which functions to control input/output operations in addition to the interaction between the microprocessor and the memory system. System 10 also includes a group of conventional peripheral units including a display device 20, a keyboard 22, a printer 24, a data storage unit 26 and a modem 28. Since the details of the above described functional systems form no part of the present invention and can be found in the prior art, only a brief functional description of each of the systems will be set forth.

The central processing unit 12 corresponds to the "system unit" of a personal computer system such as the IBM XT or the IBM AT or the IBM Personal Systems/2 computer systems. The central processing unit 12 is provided with a multitasking operating system program such as the IBM Operating System/2 which is normally employed to run the systems. The operating system program is stored in memory system 16 along with one or more application programs that the user has selected to run. Depending on the capacity of the memory system 16 and the size of the application programs, portions of these programs, as needed, may be transferred to the memory system 16 from the data storage unit 26 which may include, for example, a hard disk drive and a diskette drive. The basic function of the data storage unit 26 is to store programs and data which are employed by the system 10 and which may readily be transferred to the memory system 16 when needed. The function of the diskette drive is to provide a removable storage function for entering programs and data into the system, and a vehicle for storing data in a form that is readily transportable for use on other computer systems.

Display device 20 and keyboard 22 together provide for an interactive operation of the computer system 10 wherein the interpretation that the computer system gives to a specific keystroke by the user depends, in substantially all situations, on what is being displayed to the user at that point in time.

In certain situations, the user, by entering commands into the computer system 10, causes the system to perform a certain function. In other situations, the computer system 10 requests the entry of certain data, generally by displaying a prompt type of menu/message screen. The depth of the interaction between the user and the computer system 10 varies by the type of operating system and the application program, but is a necessary characteristic of the computer systems on which the method of the present invention may be employed.

As noted above, computer system 10 includes the printer 24 which functions to provide a hard copy output of data developed or stored in the computer system. The modem 28 functions to transfer data from the computer system 10 to a remote host system or server system through one or more communication links which may be a commercial type link or a dedicated communications link.

System 10 includes a communication software system stored in the memory system 16 thereof which enables an end user of system 10 to perform various communication tasks within the operating system. The communication software system includes a problem determination program which enables the user to request the display of specific errors or messages generated by a specific component of a communication software system. Moreover, the problem determination program enables the user to request all of the errors or messages generated by a specific component of the communication software system. Messages present user friendly text to the user which sets forth the cause of any interruption of the execution of a process or task within the software system. Error data also presents technical information, which is typically in hexadecimal representation, to the user in a friendly manner. These requests become extremely important in a multitasking environment wherein the user may activate a first task, then goes on during the execution of the first task to activate or monitor a second task. If during the time the user is activating or monitoring the second task, the first task fails. The user generally is unaware of the failure of the first task until the user decides to return to the first task. The preferred embodiment of the present invention displays a message to the user irrespective of which task the user is presently activating or monitoring. The user may then access a message log or error log for more information. The user may request more detailed information after viewing the message log.

The end user of system 10, after activating the problem determination program, may activate message service utilities or error log service utilities program. The error log service utilities provide a common interface for logging and presenting error data. The error data is typically generated as a result of a communication adapter or communication link type errors occurring at a data link controller (DLC) level. The error data facilitates the management of a communication network and provides the necessary data for problem determination in the event of a network failure. Once the error data is stored in a log, the error log service utility allows the data to be printed or visually displayed. In the preferred embodiment of this invention, all error data is stored in a file or log which is created when the operating system executing on system 10 was configured.

The message service utilities provide an interface for displaying and logging messages within the operating system. Primarily, the message service utilities provide a mechanism for relaying message information to the user which may not be related to current screen activity being viewed by the user. The message service utilities log all messages to a log to provide a history of the messages which have been generated by the various components within the operating system. This history is very useful in problem determination in that it provides a sequence of errors which led to a particular failure of the communication system.

Within the communication software system, the actions of the various components thereof may facilitate the generation of error data and/or messages. The various components or the actions thereof are referred to as originators within the problem determination program environment. For purposes of illustration and not limitation, an originator of a message or error may be the failure of a file transfer, a data link being prematurely terminated, or a terminal emulation failure.

Set out below is an illustration of the problem determination program for determining a failure within the software communication program. The problem determination program is in program design language from which source code and machine code are derivable. In the following general description of the problem determination program, it is to be assumed that system 10 is under mouse and keyboard device control. Moreover, it is assumed that the problem determination program is invoked from a driver program contained in the operating system which facilitates the display of all of the screen panels and the monitoring of the keyboard 22.

```
PROBLEM DETERMINATION PROG
    DO WHILE ESCAPE KEY IS NOT ACTIVATED
        INITIALIZE PROBLEM DETERMINATION FIELDS
        IF ERROR SELECTED THEN
            CALL ERROR LOG SERVICES
        ENDIF
        IF MESSAGE SELECTED THEN
            CALL MESSAGE SERVICES
        ENDIF
    ENDDO
END PROBLEM DETERMINATION PROG
ERROR LOG SERVICES
    DO UNTIL ESCAPE KEY IS ACTIVATED
        INITIALIZE ERROR LOG SERVICES SELECTION PANEL
        FIELDS
        DISPLAY ERROR LOG SERVICES SELECTION PANEL
        IF PRINT SELECTED THEN
            CALL PRINT SUBROUTINE
        ENDIF
        IF DISPLAY SELECTED THEN
            CALL DISPLAY SUBROUTINE
        ENDIF
    ENDDO
END ERROR LOG SERVICES
```

The print subroutine is called by the ERROR LOG SERVICES program. A print criteria panel is displayed which allows the user to enter specific search parameters. These search parameters facilitate the printing of a record which contains errors matching the specified parameters.

```
PRINT SUBROUTINE
    DO UNTIL ESCAPE KEY IS ACTIVATED
        INITIALIZE PRINT CRITERIA PANEL
        DISPLAY ERROR LOG PRINT CRITERIA PANEL
        IF THE ESCAPE KEY IS NOT ACTIVATED THEN
            DO UNTIL END OF FILE
                GATHER THE CRITERIA SPECIFIED
                OPEN THE SPECIFIED FILE
                READ A RECORD
                IF RECORD MATCHES THE SPECIFIED CRITERIA
                THEN
                    FORMAT THE RECORD
                    PRINT THE RECORD
                ENDIF
            ENDDO
        ENDIF
```

-continued

```
    ENDDO
END PRINT SUBROUTINE
```

The display subroutine is called by the ERROR LOG SERVICES program. A display criteria panel is displayed which allows the user to enter specific search parameters. These search parameters facilitate the display of a record which only contains errors matching the specified parameters.

```
DISPLAY SUBROUTINE
    DO UNTIL ESCAPE KEY IS ACTIVATED
        INITIALIZE DISPLAY CRITERIA PANEL
        DISPLAY ERROR LOG DISPLAY CRITERIA PANEL
        IF THE ESCAPE KEY IS NOT ACTIVATED THEN
            OPEN THE SPECIFIED FILE
            DO WHILE ESCAPE KEY IS NOT ACTIVATED
                GATHER THE CRITERIA SPECIFIED
                READ A RECORD
                IF AT THE TOP OF FILE THEN
                    DISABLE THE PAGE UP KEY
                ENDIF
                IF AT THE BOTTOM OF FILE THEN
                    DISABLE THE PAGE DOWN KEY
                ENDIF
                IF THE RECORD MATCHES THE SPECIFIED
                  CRITERIA THEN
                    FORMAT THE RECORD
                    DISPLAY THE RECORD
                ENDIF
                IF PAGE UP KEY IS PRESSED THEN
                    MOVE FILE POINTER TO THE PREVIOUS RECORD
                    IN THE FILE
                ENDIF
                IF THE PAGE DOWN KEY IS PRESSED THEN
                    MOVE FILE POINTER TO THE NEXT RECORD IN
                    THE FILE
                ENDIF
            ENDDO
        ENDIF
    ENDDO
END DISPLAY SUBROUTINE
MESSAGE SERVICES
    DO UNTIL ESCAPE KEY IS ACTIVATED
        INITIALIZE DISPLAY CRITERIA PANEL
        DISPLAY MESSAGE CRITERIA PANEL
        IF THE ESCAPE KEY IS NOT ACTIVATED THEN
            DO WHILE ESCAPE KEY IS NOT ACTIVATED
                OPEN THE SPECIFIED FILE
                READ A RECORD
                IF AT THE TOP OF FILE THEN
                    DISABLE THE PAGE UP KEY
                ENDIF
                IF AT THE BOTTOM OF FILE THEN
                    DISABLE THE PAGE DOWN KEY
                ENDIF
                IF THE RECORD MATCHES THE SPECIFIED
                 CRITERIA THEN
                  FORMAT THE RECORD
                  DISPLAY THE RECORD
                ENDIF
                IF HELP KEY IS PRESSED THEN
                    DISPLAY HELP TEXT
                ENDIF
                IF PAGE UP KEY IS PRESSED THEN
                    MOVE FILE POINTER TO THE PREVIOUS RECORD
                    IN THE FILE
                ENDIF
                IF THE PAGE DOWN KEY IS PRESSED THEN
                    MOVE FILE POINTER TO THE NEXT RECORD IN
                    THE FILE
                ENDIF
            ENDDO
        ENDIF
    ENDDO
END MESSAGE SERVICES
```

The display subroutine is called by ERROR LOG SERVICES program and facilitates the display of an error log display criteria panel. The user then enters the required search parameters. The display subroutine then search the appropriate error log record for the errors which match the search parameters. Thereafter, the record is formatted and displayed to the user. The user after the record is displayed, may scroll through the file by activating the appropriate function keys.

Figure 2:
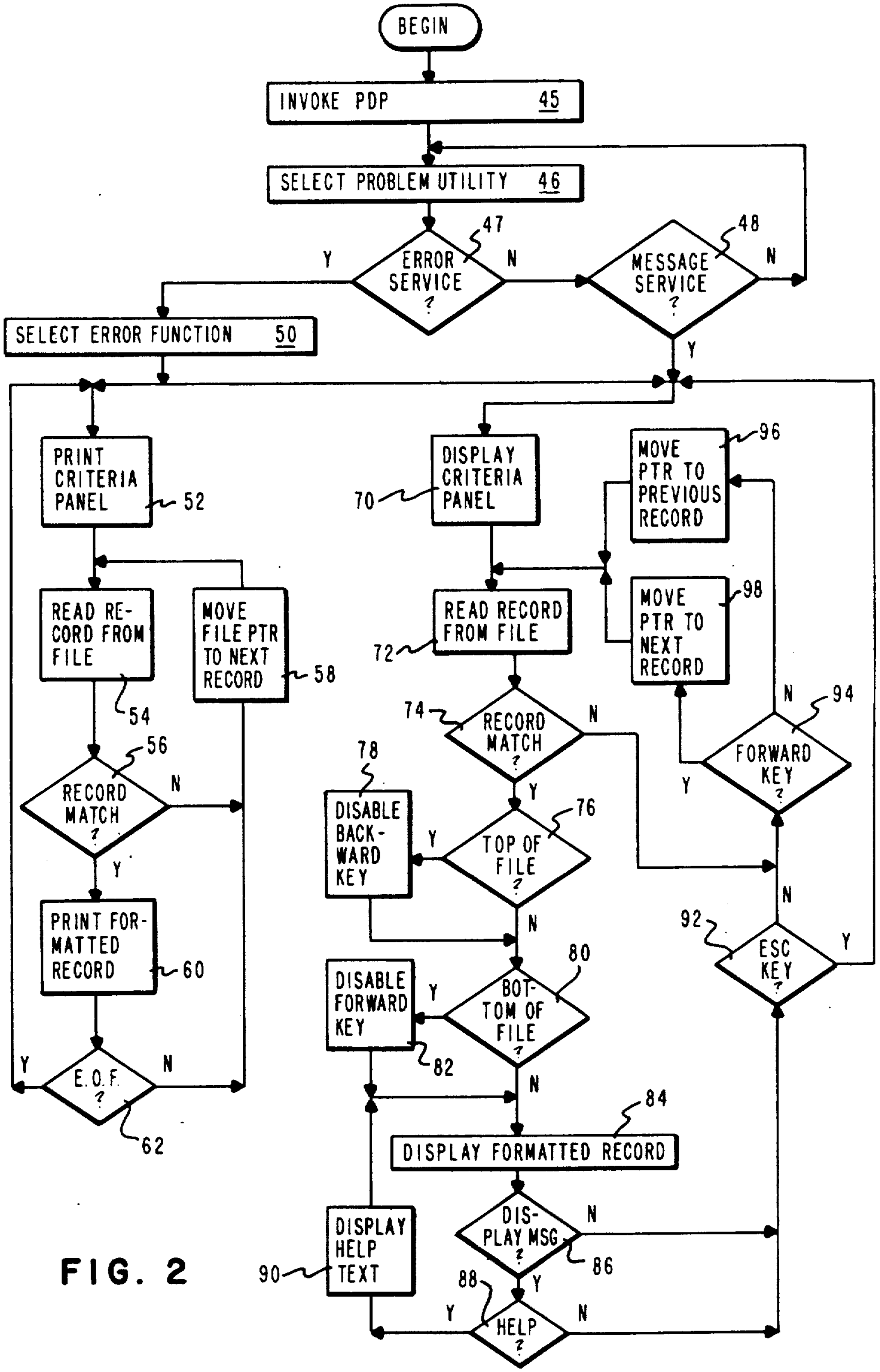
FIG. 2 is a flow diagram illustrating the detailed steps of the method of the present invention.

Referring to FIG. 2, there is shown a flow diagram for the problem determination program. After invoking the problem determination program in step 45, the user selects one of a plurality of problem determination utilities, such as the error log services or the message services. Step 47 determines whether the error services utility was selected. Step 48 determines whether the message services was selected. If the error log services was selected, control is transferred from step 47 to step 50. In step 50, the user selects either a print function or a display function from the error log services panel. The error log services panel also displays a default error log name to be used with the selected function. If the print function is selected, the print criteria panel is displayed in step 52 wherein the user enters the desired search parameters. The search parameters include a starting and ending dates and times and an error log type. If the user specifies the starting date and time, the first error log entry printed will be on or after the date/time specified. However, if the user leaves the starting date and time fields blank, the print subroutine begins printing with the oldest error log record. If the log type specified is an entry other than "0000", only the error log entries of the specified type will be selected to be printed. In step 54, the print subroutine reads a record from the selected error log. A determination is made in step 56 whether the record matches the search parameters. If the record does not match the search parameters, a file pointer is moved to the next subsequent record in step 58. However, if the record matches the search parameters, the record is formatted and printed in step 60. Step 62 determines whether the end of the file has been reached, if not the next record is read and the comparison is made for a match, otherwise, control is returned to step 52.

If the display subroutine was selected in step 50, a display criteria panel is displayed to the user in step 70. The user then enters the appropriate search parameters which includes specifying a log name, if it is different from the default name displayed in the panel, an error log record type, and from date and time. If the user fails to enter a from date and a from time and the log type is "0000", the oldest error log is displayed and the entire specified error log will be available for display. If the entry for the log type an entry other than "0000", and the from date and time are specified, the first error log record displayed will be on or after the date/time specified and only the error log records of the specified type will be available for display. If the log type is an entry other than "0000" and the date and time are left blank, the first error log record displayed will be the oldest error log record for the specified type and only the error log records of the specified type will be available for display. Thus, step 72 reads a record from the file selected. A comparison is made in step 74 to determine whether the record matched the search parameters. If the record matches the search parameters, a determination is made in step 76 whether a file pointer is at the top of the file. Step 78 disables a backward key if the pointer is at the top of the file. A determination is made in step 80 to determine if the pointer is at the bottom of the selected file. Step 82 disables the forward key if the pointer is at the bottom of the file. In step 84, the record is formatted and displayed to the user. In step 86 a determination is made whether a message is being displayed. Since the user selected the error services in step 46, control is transferred to step 92. In step 92, a determination is made whether an escape key was activated. Control is returned to step 70, if the escape key is activated. Otherwise, step 94 determines whether the forward or backward key was activated. In step 96, if the backward key was activated, the pointer is moved to the immediately previous record which is then read and displayed if the record matches the search parameters. In step 98, if the forward key was activated, the pointer is moved to the immediately subsequent record which is then read and displayed if the record matches the search parameters. The procedure which includes steps 72 through 86 and 92 through 98 are repeated until the escape key is activated and detected in step 92.

If the message services was selected in step 47, control is transferred from step 48 to step 70. Steps 70 through 86 are identical to those described for the display function of the error services utility noted above. However, since the message services were selected in step 47, the type parameter will be replaced with an originator parameter. The originator identifies the component that generated the message and the record displayed will represent a message. Thus, control is transferred from step 86 to step 88. Step 88 determines whether the user has activated a help function. This activity indicates that the user in viewing a selected message record is requesting more detail information regarding the displayed message record. The additional information is displayed to the user in step 90 and control is returned to step 84. The system 10 will continue to display the additional information until the user activates either the backward key, the forward key or the escape key. Thereafter steps 86, and 92 through 98 are executed in the same manner described for the display function explained above for the error services utility.

Shown in FIG. 3 is a error log services panel. This panel is displayed to the user after the error services utility is selected and allows the user to select the type of error log processing desired. The log may be printed on printer 24 (FIG. 1) or displayed on the display 20 (FIG. 1). Upon selection of one of the processing options, an error log display criteria pop-up panel, shown in FIG. 4, is displayed which allows the user to enter specific criteria for the records to be processed. The error log display criteria pop-up panel which is displayed to the user upon the selection of the display processing option. The criteria includes at least the error log record type and the time and/or the date associated with the record to be displayed. If the user desires to display an error log file other than the one currently being used, the user enters the desired error log file in the log name entry field. The criteria fields provide the user with a mechanism for specifying a starting point, from date and/or from time, and a filter, log type for the type of error the user desires to view. If the user fails to specify any criteria, which means that the date and time fields are blank and the log type is equal to "0000", the oldest error log record will be displayed which contains any type of error. If the log type is specified only, the records of the specified type will be available for display. Shown in FIG. 5 is a error log display panel which is displayed in response to the processing of the error log display criteria panel (FIG. 4). The panel includes all of the specified errors, if any, which occurred on or after the specified date and time, if specified. The "h letters" appearing in the panel indicate that the data is to be interpreted as hexadecimal and the "x letters" indicate the data is to be interpreted as ASCII. Once a record has been displayed, the user may be scroll in a forward direction or in a backward direction starting with the specified date and time to display a next or previous entries of the error log which satisfy the criteria.

If the user selects the print processing function for the error services, an error log print criteria pop-up panel shown in FIG. 6 will be displayed to the user. This panel allows the user to enter specific criteria for selecting error log records to be printed. The criteria may include the error log record type and the time and/or date associated with the record. The user may also enter the name of an error log file other than the one currently being used. If no criteria are specified, all error log records of all types will be printed in chronological order. If the log type is specified, only the error log records of the specified type will be printed. FIG. 7 shows an example of an error log printout.

If the user selected the messages service, a display messages panel shown in FIG. 8 will be displayed to the user. The criteria fields on the panel allow the user to provide specific selection criteria for the messages to be displayed. The criteria includes a message originator, message date, and message time. The user may request that system 10 (FIG. 1) display a list of the originators, as shown in FIG. 9, which may be entered in the originator field. If no criteria is specified, the most recent messages from any originator will be displayed in chronological order with the latest message at the bottom of the display screen. If only the originator is specified, only those messages from the specified originator will be displayed. If only the time and date are specified, the first message displayed will be of any originator chronologically following the specified time and date. From this point, any messages of any originator with any time or date will be available for display. The date and time entries are primarily used to correlate a message with an associated error log entry. FIG. 10 shows a message log display panel which is displayed to the user subsequent to the processing of the display message panel (FIG. 8). In the event that there are more messages than are displayed, the user may page forward and backward to permit all of the selected messages to be viewed.

While the invention has been particularly shown and described with reference to a preferred embodiment, it will be understood by those skilled in the art that various changes in form and detail may be made without departing from the spirit and scope of the invention.

We claim:

1. In a multitasking computer system, a method of generating and retrieving error log records in said computer system, said method comprises the steps of:

operating a determination program to detect errors in the execution of a first task activated by a user of the multitasking computer system while the user interacts with a second task;

storing detected first task errors as records accessible by parameter reference through error log services;

enabling through a peripheral of said computer system an error log service;

entering a set of service type and time parameters into said system, which parameters can be associated with a record stored therein;

having said computer system retrieve a record which matches selected entered parameters; and displaying to said user by operation of a selected utility program in said computer system said retrieved records in a predetermined format, specific criteria within said entered set of parameters and any data associated with said retrieved record.

2. The method as recited in claim 1 wherein said selected utility program is a print generation utility program and performs within said computer system the steps of:

accessing a record retrieved by the error log services;

comparing to selectively match said record to selected parameters; and printing a record if said record matches selected parameters.

3. The method as recited in claim 1 wherein said selected utility program is a video display utility program and performs within said system the steps of:

accessing a record retrieved by the error log services;

comparing said record to said entered parameters;

displaying said retrieved record if said retrieved record matches all of said entered parameters; and displaying said list of records having a selected one of said parameters in common;

whereby said retrieved record is highlighted in relation to said list of records upon display.

4. In a multitasking computer system, a method of generating and retrieving task message records in said computer system, said method comprises the steps of:

operating a determination program to detect messages in the execution of a first task activated by a user of the multitasking computer system while the user interacts with a second task;

storing detected first task messages as records accessible by parameter reference through message services;

enabling through a peripheral of said computer system a message service;

entering a set of service type and time parameters into said system, which parameters can be associated with a record stored therein;

having said computer system retrieve a record which matches selected entered parameters; and displaying to said user by operation of a selected utility program in said computer system said retrieved record in a predetermined format, specific criteria within said entered set of parameters and any data associated with said retrieved record.

5. The method as recited in claim 4 wherein said retrieved record is a first record and further includes the steps of:

retrieving another record from said computer system subsequent to the retrieval of said first record;

comparing said another record to said entered message service parameters;

displaying said another record if said another record matches said parameters; and retrieving other records stored in said system until all records which match said parameters have been displayed.

* * * * *